US008194062B2

(12) United States Patent
Sugamata

(10) Patent No.: US 8,194,062 B2
(45) Date of Patent: Jun. 5, 2012

(54) DISPLAY TERMINAL AND COMPUTER-READABLE MEDIUM STORING DISPLAY TERMINAL PROGRAM

(75) Inventor: Hiroki Sugamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 664 days.

(21) Appl. No.: 12/392,837

(22) Filed: Feb. 25, 2009

(65) Prior Publication Data

US 2009/0213106 A1 Aug. 27, 2009

(30) Foreign Application Priority Data

Feb. 25, 2008 (JP) ................................ 2008-042493

(51) Int. Cl.
*G06F 3/038* (2006.01)

(52) U.S. Cl. ............... 345/211; 345/204; 345/5; 345/30

(58) Field of Classification Search .................. 345/211, 345/204, 87, 5, 30
See application file for complete search history.

(56) References Cited

U.S. PATENT DOCUMENTS

| | | | | |
|---|---|---|---|---|
| 6,734,863 | B1 | 5/2004 | Ikeda | |
| 6,750,857 | B2 * | 6/2004 | Bae et al. | 345/211 |
| 2002/0041262 | A1 * | 4/2002 | Mukai et al. | 345/30 |
| 2002/0060673 | A1 * | 5/2002 | Noritake et al. | 345/204 |
| 2006/0007217 | A1 * | 1/2006 | Kanbe et al. | 345/204 |
| 2006/0209059 | A1 | 9/2006 | Iwasaki | |
| 2008/0007486 | A1 * | 1/2008 | Fujinawa et al. | 345/5 |
| 2008/0186300 | A1 * | 8/2008 | Iwasaki | 345/211 |
| 2009/0231252 | A1 * | 9/2009 | Maegawa | 345/87 |

FOREIGN PATENT DOCUMENTS

| | | | |
|---|---|---|---|
| EP | 1865367 | A1 | 12/2007 |
| JP | H06-295165 | A | 10/1994 |
| JP | H08-160395 | A | 6/1996 |
| JP | 2001-211270 | A | 8/2001 |
| JP | 2004-037705 | A | 2/2004 |
| JP | 2005-266191 | A | 9/2005 |
| JP | 2006-139145 | A | 6/2006 |
| JP | 2007-187927 | A | 7/2007 |

OTHER PUBLICATIONS

European Patent Office; European Search Report in European Patent Application No. 09001536.3 (counterpart to the above-captioned US Patent Application) mailed on Aug. 16, 2010.
Japan Patent Office, Decision on Rejection for Japanese Patent Application No. 2008-042493 (counterpart to above-captioned patent application), mailed Aug. 9, 2011.
Japan Patent Office; Notification of Reasons for Rejection in Japanese Patent Application No. 2008-042493 (counterpart to the above captioned US application) mailed May 25, 2010.
Japan Patent Office, Notification of Reasons for Rejection for Patent Application No. JP 2008-042493 (counterpart to above-captioned patent application), mailed Jan. 18, 2011.

* cited by examiner

*Primary Examiner* — Thuy Pardo
(74) *Attorney, Agent, or Firm* — Baker Botts L.L.P.

(57) ABSTRACT

A display terminal includes a nonvolatile display device and a power-off control device. The display device has a display region and holds display in the display region even if a supply of power from a power source is cut off. The power-off control device updates only the display in a partial display region, which is a part of the display region, with display of notification information indicating that the power supply has been cut off. The power-off control device also performs processing to cut off the supply of power from the power source to the display terminal.

8 Claims, 11 Drawing Sheets

DISPLAY TERMINAL AND COMPUTER-READABLE MEDIUM STORING DISPLAY TERMINAL PROGRAM

CROSS-REFERENCE TO RELATED APPLICATION

This application claims priority to Japanese Patent Application No. 2008-042493, filed Feb. 25, 2008, the disclosure of which is incorporated herein by reference in its entirety.

BACKGROUND OF THE INVENTION

1. Field of the Invention

The present invention relates to a display terminal and a computer-readable medium storing a display terminal program. More specifically, the present invention relates to a display terminal equipped with a nonvolatile display device and a computer-readable medium storing a display terminal program that controls the display terminal equipped with the nonvolatile display device.

2. Description of Related Art

A known display terminal equipped with a nonvolatile display device has been used. The nonvolatile display device holds a display condition even if a power supply has been cut off. Even if such a known display terminal holds the display condition at the time when a power supply is turned off, it may not be possible for a user to continuously use the display terminal, unless the user recognizes what information is displayed on the display terminal upon next start-up. To solve the problem, a known display terminal, such as the display terminal described in Japanese Patent Application Laid-Open Publication No. 2007-187927, stores the most recently displayed information in a nonvolatile storage device.

SUMMARY

The above-described known display terminal may hold the information just as the information was displayed at the time when the power supply was turned off. Therefore, in some cases, the user may not know whether the power supply is ON or OFF. If the power is OFF when the user is going to use the display terminal, the display terminal may take some time to start. As a result, the display terminal may not respond to instructions of the user soon enough, thus the user may be confused.

Various exemplary embodiments of the general principles herein provide a display terminal that enables the user to easily recognize that the power supply is off while a display condition is held on a nonvolatile display device and a computer-readable medium storing a display terminal program that controls the display terminal.

Exemplary embodiments provide a display terminal that includes a nonvolatile display device and a power-off control device. The display device has a display region and holds a display in the display region even if supply of power from a power source is cut off. The power-off control device updates only the display in a partial display region, which is a part of the display region, with display of notification information indicating that the power supply has been cut off. The power-off control device also performs processing to cut off the supply of power from the power source to the display terminal.

Exemplary embodiments also provide a computer-readable medium storing a program for a display terminal having a display device that has a display region and holds a display in the display region even if supply of power from a power source is cut off. The program causes a controller of the display terminal to execute instructions of updating only the display in a partial display region, which is a part of the display region, with display of notification information indicating that power supply has been cut off, and performing processing to cut off the supply of power from the power source to the display terminal.

Other objects, features, and advantages of the present invention are apparent to persons of ordinary skill in the art in view of the foregoing detailed description of the invention and the accompanying drawings.

BRIEF DESCRIPTION OF THE DRAWINGS

Exemplary embodiments of the invention are described below in detail with reference to the accompanying drawings in which.

DETAILED DESCRIPTION OF EXEMPLARY EMBODIMENTS

Figure 1:
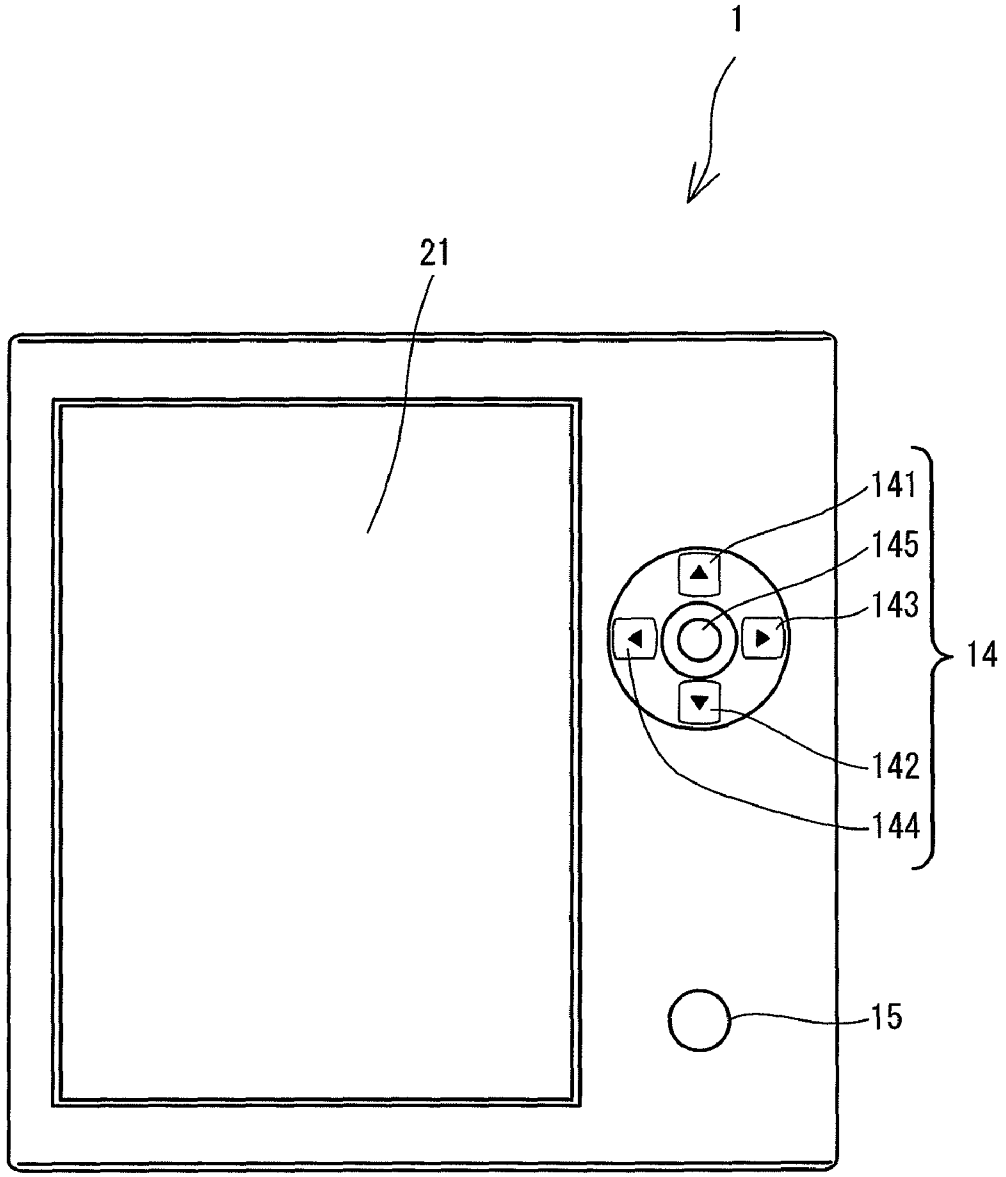
FIG. 1 is a front view of a display terminal.

An embodiment of the present disclosure is described with reference to the drawings. First, the external view and main operations of a display terminal 1 is described below with reference to FIG. 1. As shown in FIG. 1, the display terminal 1 is roughly rectangular solid-shaped and equipped with an electrophoretic display device 21 on a front surface. Although not shown in FIG. 1, on a right side surface of the display terminal 1, a card slot is formed. A memory card 23 (see FIG. 2) may be inserted into the card slot. The display terminal 1 may display a content and auxiliary information of the content that are stored in the memory card 23 on the electrophoretic display device 21. In the present embodiment, at least one of a character, a still image, and a moving image may be displayed as the content on the electrophoretic display device 21. The content includes at least one of data to display the character, data to display the still image, and data to display the moving image. Hereinafter, the data to display the character, the still image, and the moving image is respectively referred to as a content. In the present embodiment, auxiliary information that accompanies the content and includes at least information to identify the content is stored in the memory card 23. Besides the information to identify the content, the auxiliary information also may include various kinds of information about the content that may be set as required. Examples of the information contained in the auxiliary information may include a date and time of creation, a creator, and a data size of the content.

To the right side of the electrophoretic display device 21, operation keys 14 are provided. The operation keys 14 include an up key 141, a down key 142, a right key 143, a left key 144, and a determine key 145. On the upper, lower, right and left sides of the determine key 145, the up key 141, the down key 142, the right key 143 and the left key 144 are respectively arranged. The up key 141 and the down key 142 may be used to select a content on a table-of-contents screen or on a menu screen. The right key 143 and the left key 144 may be used to turn over pages of a displayed content. If the user operates any of the operation keys 14 in accordance with information displayed on the electrophoretic display device 21, the content stored in the memory card 23 may be displayed or instructions to perform various kinds of setting may be entered. Below the operation keys 14, a power supply button 15 is provided. The power supply button 15 may be used for instructing turning on or off of power supply to the display terminal 1.

Figure 2:
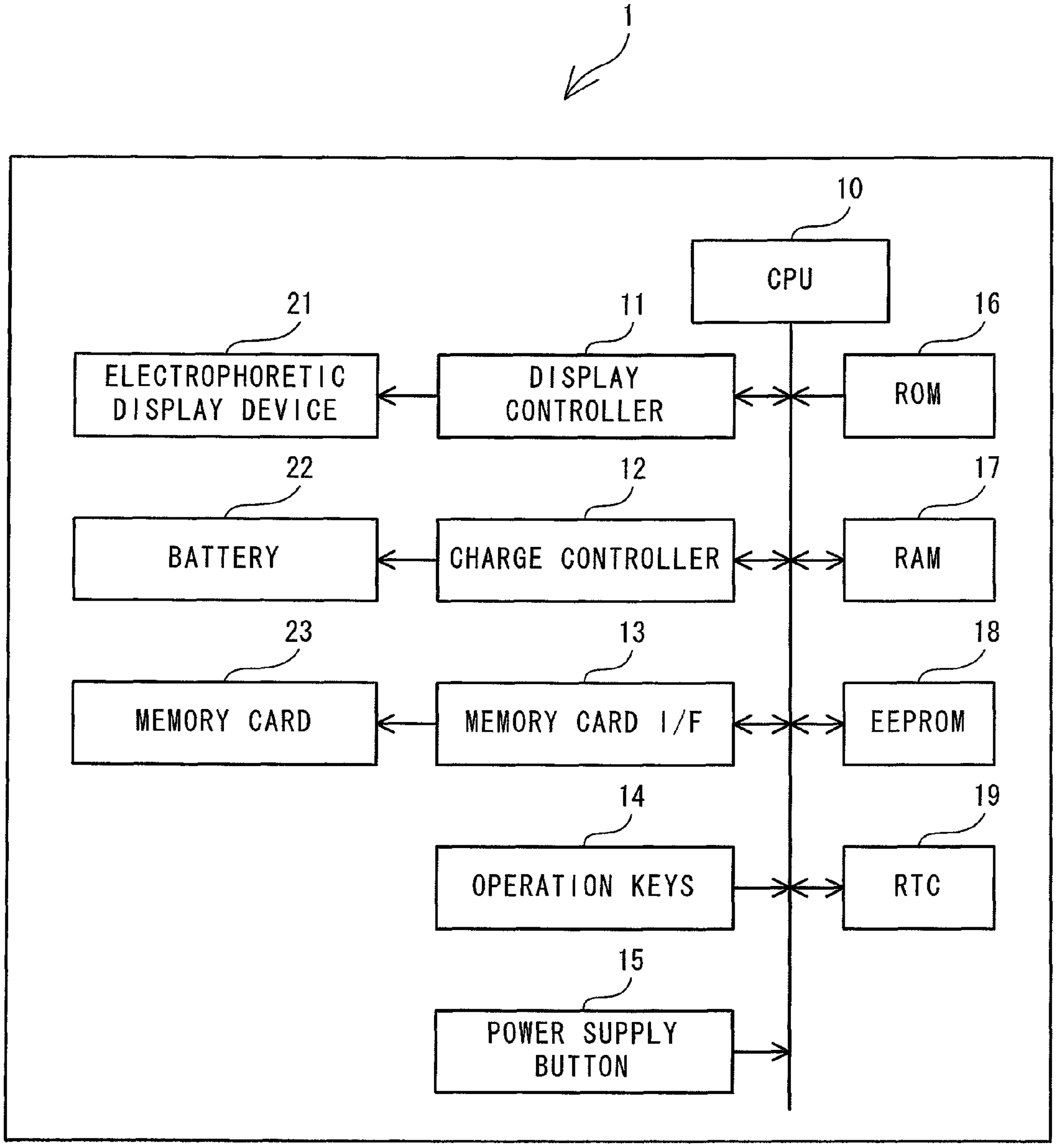
FIG. 2 is a block diagram illustrating an electrical configuration of a display terminal.

Next, the electrical configuration of the display terminal 1 is described below with reference to FIG. 2. As shown in FIG. 2, the display terminal 1 includes a CPU 10, a display controller 11, a charge controller 12, a memory card interface (I/F) 13, the operation keys 14, the power supply button 15, a ROM 16, a RAM 17, an EEPROM 18, and an RTC (Real Time Clock) 19. The CPU 10 controls the display terminal 1. Various kinds of information and a display terminal program that controls the operations of the display terminal 1 may be stored in the ROM 16. The RAM 17 is a memory that may store various kinds of data temporarily. The EEPROM 18 is a nonvolatile memory that may store the identification number of the display terminal 1 and the like. The RTC 19 measures time.

The display controller 11 controls display of the information on the electrophoretic display device 21 (see FIG. 1). A memory card I/F 13 controls reading of information from the memory card 23 and writing of information to the memory card 23. When the display terminal 1 is not supplied with power from an external power. source (not shown), the display terminal 1 may be driven by power from a battery 22. There are two paths for supplying power from the battery 22 or the external power source. One of the two paths leads to the CPU 10 and the other leads to peripheral devices such as the ROM 16, the RAM 17, the EEPROM 18, and the display controller 11. The charge controller 12 controls charging of the battery 22 from the external power supply.

Figure 3:
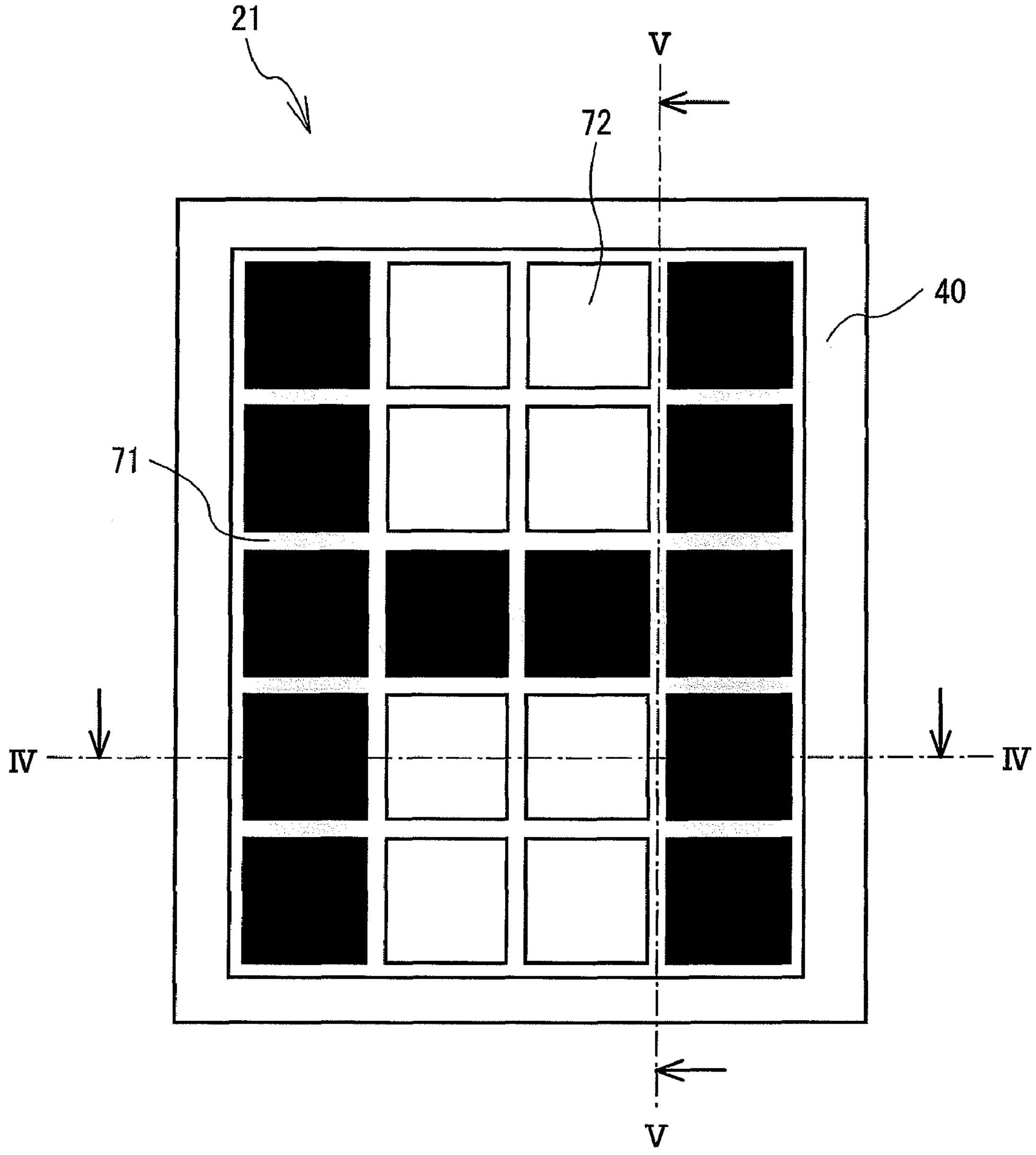
FIG. 3 is a front view of an electrophoretic display device.
Figure 4:
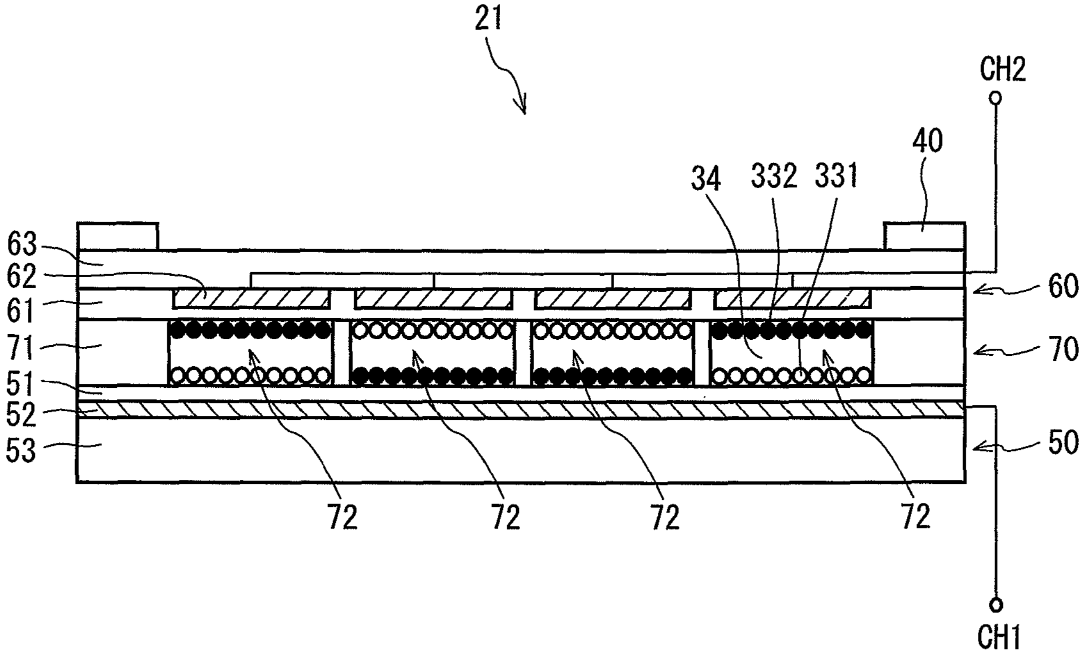
FIG. 4 is a cross-sectional view of the electrophoretic display device taken along line IV-IV of FIG. 3, as viewed in an arrow direction.
Figure 5:
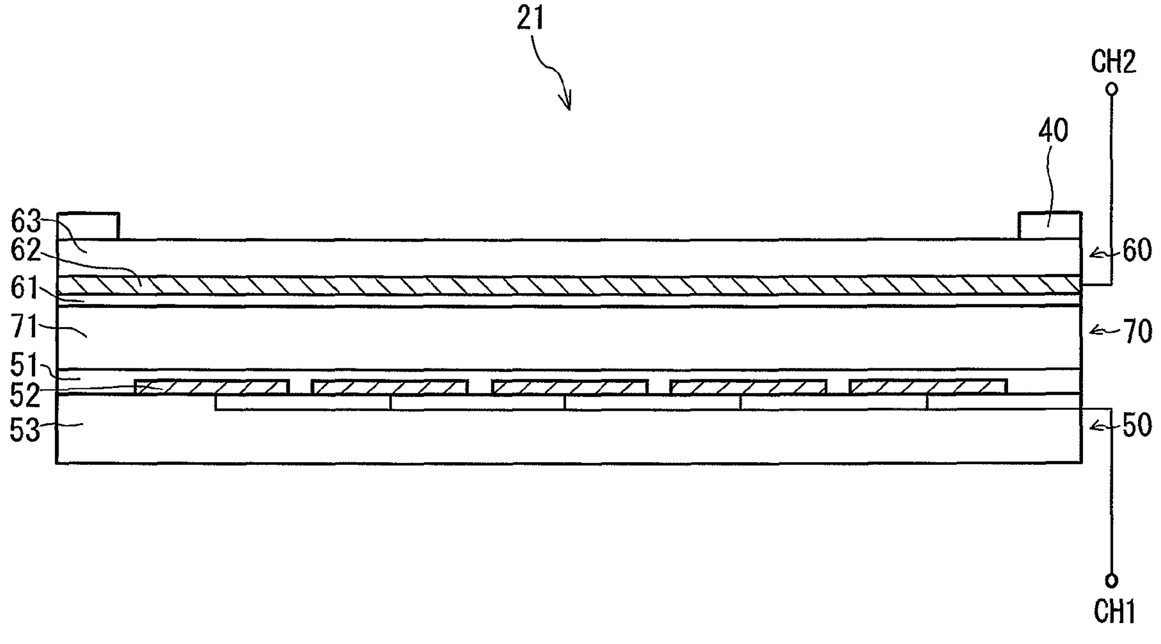
FIG. 5 is a cross-sectional view of the electrophoretic display device taken along line V-V (FIG. 3) as viewed in the arrow direction.

The physical configuration of the electrophoretic display device 21 is outlined below with reference to FIGS. 3 to 5. The electrophoretic display device 21 is a nonvolatile display and holds a display condition even if power supply for the display device 1 is cut off. As shown in FIGS. 3 to 5, the electrophoretic display device 21 includes a back substrate 50 arranged at a back side of the display terminal 1, a front substrate 60 arranged at a front side of the display terminal 1 to face the back substrate 50, and a display portion 70 formed between the back substrate 50 and the front substrate 60. In FIG. 3, line IV-IV indicates a line parallel to the horizontal line (right-and-left direction in FIG. 1) of the display terminal 1 and line V-V indicates a line parallel to the vertical line (up-and-down direction in FIG. 1) of the display terminal 1. It should be noted that for ease of explanation, in FIGS. 3 to 5, the number of pixels is assumed to be 20 (=5×4). In reality, however, any number of pixels may be provided, as required.

The back substrate 50 includes back electrodes 52, a back electrode protection film 51, and a package support portion 53. The back electrodes 52 generate an electric field to the display portion 70. The back electrode protection film 51 is an insulating film formed by, for example, applying an insulating material over the front side surfaces of the back electrodes 52. The package support portion 53 is disposed on the back side of the back electrodes 52, to support the electrophoretic display device 21. The back electrode protection film 51 may be made of a material that gives a high degree of insulation. Examples for the material may include a resin film made of polyethylene terephthalate or silica, and inorganic materials such as glass. In the present embodiment, the back electrode protection film 51 and the package support portion 53 are each formed as a plastic substrate (resin film) made of flexible polyethylene terephthalate. The back electrodes 52 are a plurality of strip-shaped electrodes made of an electric conductor, to which a constant voltage may be applied. The back electrodes 52 are arranged parallel to each other in the horizontal direction (in the direction of line IV-IV).

In the front direction of the back substrate 50 (upward direction in FIGS. 4 and 5), the front substrate 60 is arranged to face parallel to the back substrate 50 at a predetermined distance from the back substrate 50. The front substrate 60 includes front electrodes 62, a front electrode protection film 61, and a display layer 63. The front electrodes 62 generate an electric field to the display portion 70. The front electrode protection film 61 is an insulating film formed by, for example, applying an insulating material over the back side surfaces of the front electrodes 62. The display layer 63 is formed of a transparent member disposed over the front side surfaces of the front electrodes 62, thus functioning as a display screen. The front electrode protection film 61 is made of a material that gives a high degree of transparency. Examples for the material include polyimide, polyethylene terephthalate, and glass. The front electrodes 62 are a plurality of band-shaped electrodes made of an electric conductor, to which a constant voltage may be applied. The front electrodes 62 are arranged parallel to each other in the vertical direction (in the direction of line V-V). The front electrodes 62 are also made of a material that can give a high degree of transparency. In the present embodiment, the front electrode protection film 61 is a plastic substrate (resin film) made of polyethylene terephthalate. The front electrodes 62 are transparent electrodes made of indium tin oxide (ITO). The display layer 63 is formed of a glass substrate. Thus, the front substrate 60 is transparent. Therefore, the front substrate 60 may function as a display substrate through which the user visually recognizes the display portion 70 when viewing from the front (from the upper side in FIG. 2).

Next, the display portion 70 is described below. A space formed by the back substrate 50 and front substrate 60 facing each other with a spacer 71 therebetween makes the display portion 70. The spacer 71 is a flexible, plate-like member having a plurality of through-holes formed in a lattice pattern. The spacer 71 may be made of synthetic resin, such as polyimide or polyethylene terephthalate. The spacer 71 is disposed in a gap between the back substrate 50 and the front substrate 60. The spacer 71 evenly divides the space between the back substrate 50 and the front substrate 60 into a plurality of small partitioned cells 72 in the lattice pattern and also supports the back substrate 50 and the front substrate 60.

Each of the small partitioned cells 72 is filled with charged particles 331 and 332, as well as a dispersion medium 34. Each of the charged particles 331 and 332 is made of a material that may be charged in the dispersion medium 34. The material for the charged particles 331 and 332 may be, for example, a pigment or a dye that is made of an organic or inorganic compound, or a pigment or a dye coated with a synthetic resin. In the present embodiment, a mixture of styrene resin and titanium dioxide is employed for the material of the charged particles 331. The charged particles 331 have an average particle diameter of 5 μm (7 weight percent), and contain the titanium dioxide in an amount of 40 weight percent with respect to the total amount of the particles. A mixture of styrene resin and carbon black is employed for the material of the charged particles 332. The charged particles 332 have an average particle diameter of 5 μm (10 weight percent), and contain the carbon black in an amount of 30 weight percent with respect to the total amount of the particles. Accordingly, the charged particles 331 have a color tone of white and the charged particles 332 have a color tone of black. The charged particles 331 and the charged particles 332 are charged oppositely, that is, the charged particles 331 are positively charged and the charged particles 332 are negatively charged, or vice versa. In the present embodiment, the charged particles 331 are negatively charged and the charged particles 332 are positively charged.

Alcohols, hydrocarbon, and silicone oil, which give a high degree of insulation and have a low viscosity may be employed as the dispersion medium 34. In the present embodiment, a paraffin-based solvent Isopar (73 weight percent) made by Exxon Mobil Corporation is employed as the dispersion medium 34. Ethanol (10 weight percent) is added as an additive agent to the dispersion medium 34.

On the front surface (a surface that does not face the back substrate 50) of the front substrate 60, a mask portion 40 is mounted to prevent the user from visually recognizing a peripheral portion of the display portion 70 where the small partitioned cells 72 are not present in the front view. The mask portion 40 is a plate-like frame member that surrounds a through-hole with a constant width, and runs along the four sides of the front substrate 60. The mask portion 40 may be formed by applying colored synthetic resin, such as polyethylene terephthalate or by printing a layer of ink onto the surface of the display layer 63. In such a manner, the electrophoretic display device 21 has a configuration that permits the user to visually recognize the display portion 70 through the through-hole formed in the mask portion 40.

Next, a display region 210 of the electrophoretic display device 21 will be described below with reference to FIGS. 6 to 8. The display region 210 of the electrophoretic display device 21 refers to a region that is visually recognized through the through-hole formed in the mask portion 40 of the electrophoretic display device 21 described with reference to FIGS. 3 to 5.

Figure 6:
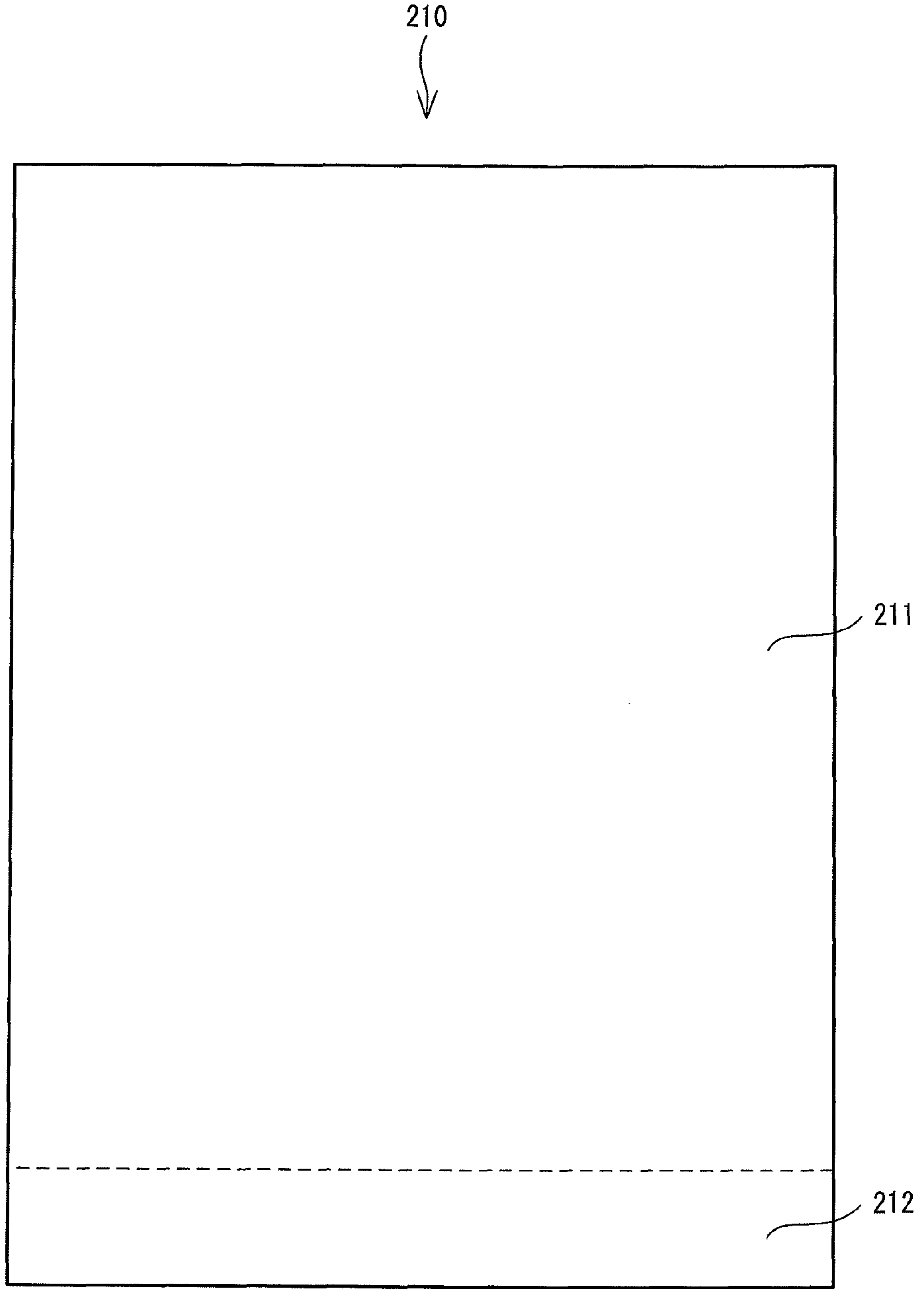
FIG. 6 is a schematic view of a configuration of a display region of an electrophoretic display device.

As shown in FIG. 6, the display region 210 of the electrophoretic display device 21 may include a first display region 211 and a second display region 212. The first display region 211 may be a main region in which main information may be displayed in response to an operation of the user to the display terminal 1. In the first display region 211, for example, a menu screen, a setting screen, or a content may be displayed. In the second display region 212, information that supplements the main information displayed in the first display region 211 or auxiliary information about the display terminal 1 may be displayed. When a content, which is the main information, is displayed in the first display region 211, adjunct information of the content, for example, may appear as the information that supplements the main information. Further, the auxiliary information about the display terminal 1 may be, for example, a remaining battery level of the battery 22 of the display terminal 1 or present date and time. Notification information that notifies that power supply for the display terminal 1 has been cut off may be another example of the auxiliary information.

Figure 7:
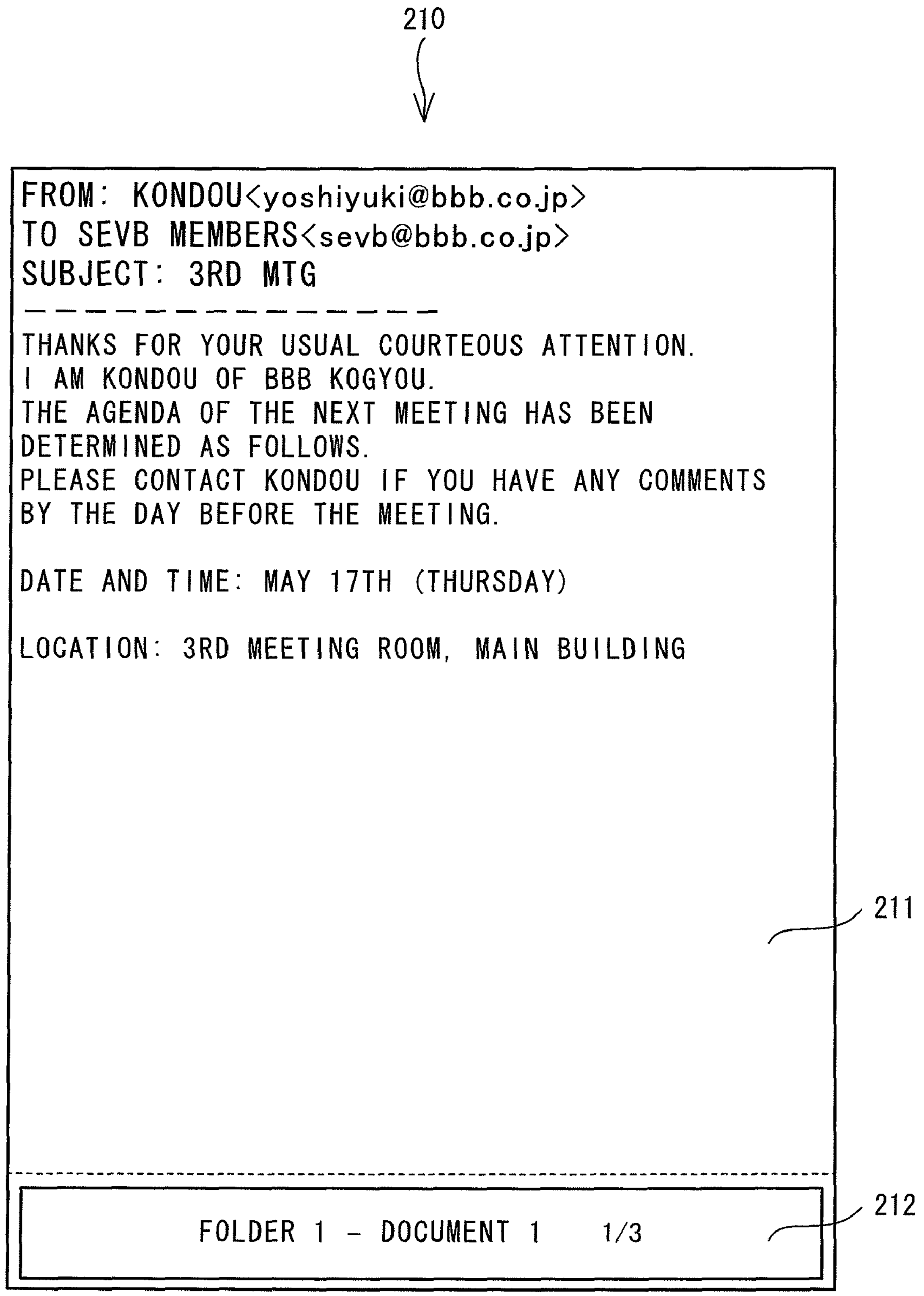
FIG. 7 is a schematic view illustrating a condition in which contents are displayed in a display region.
Figure 8:
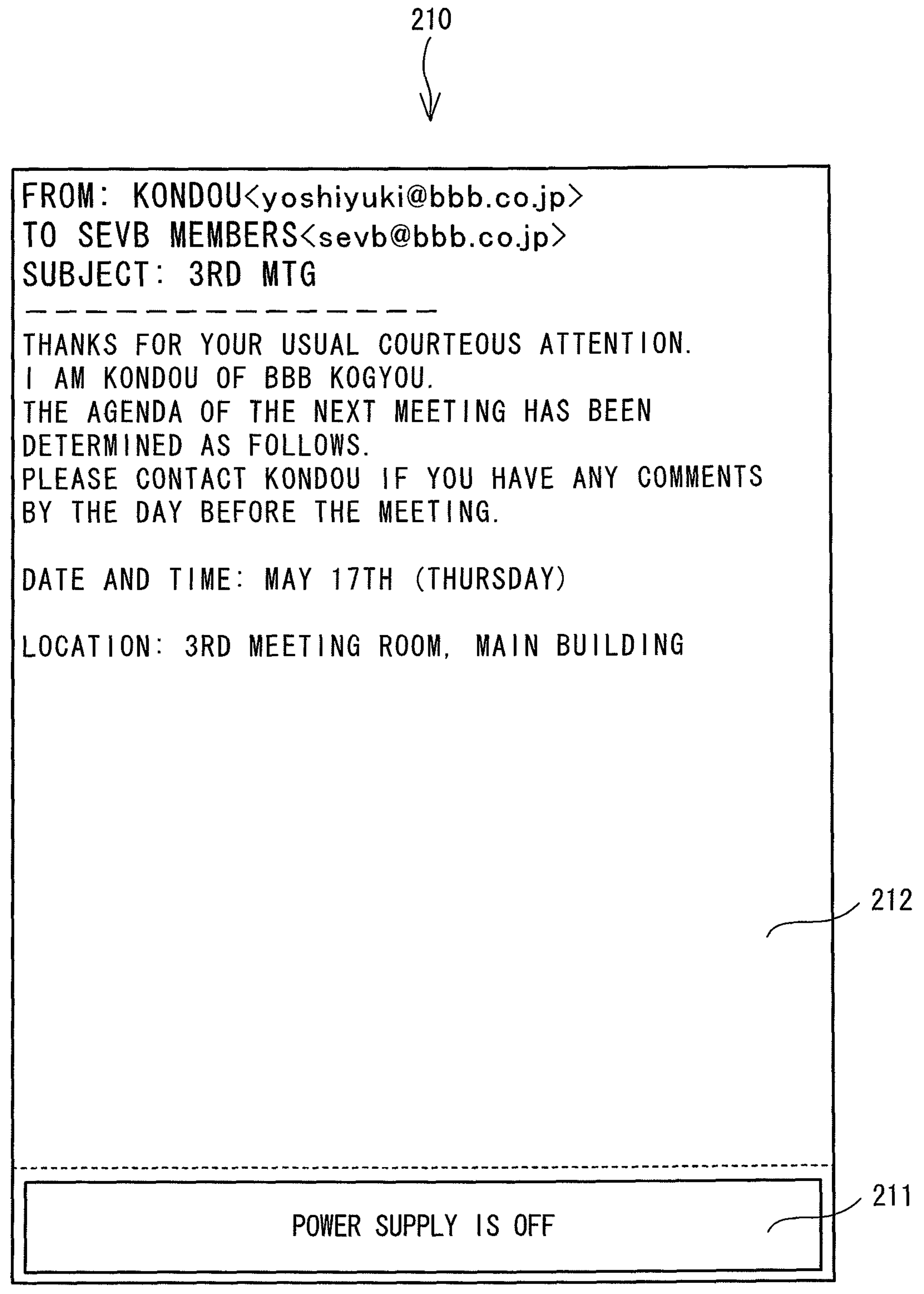
FIG. 8 is another schematic view illustrating a condition in which contents are displayed in a display region.

For example, as respectively shown in FIGS. 7 and 8, while the first display region 211 displays a content, the second display region 212 displays adjunct information of the content displayed in the first display region 211 or notification information that indicates that power supply to the display terminal 1 has been cut off. In an example shown in FIG. 7, the second display region 212 displays a saving location (folder 1), a content name (document 1), and a page number of the currently displayed page and the total number of pages (1/3). A dotted line (border line between the first display region 211 and the second display region 212) shown in FIG. 7 is given for a descriptive purpose to differentiate the two regions. Accordingly, the dotted line actually is not displayed on the electrophoretic display device 21.

The first display region 211 occupies a larger area than the second display region 212. In an example shown in FIG. 6, the first display region 211 occupies 90% and the second display region 212 occupies 10% of the total area of the display region 210. The second display region 212 is arranged at the bottom of the display region 210, so as not to stand in the way of the content displayed in the first display region 211.

The user of the display terminal 1 may instruct turning on or off of the power supply by pressing the power supply button 15. If the power supply button 15 or any of the operation keys 14 is pressed when the power supply is off, the operation is taken as an instruction to apply power. In such a case, power will be supplied to the CPU 10 and the peripheral devices, thus starting up the display terminal 1. On the other hand, if the power supply button 15 is pressed when the power is on, the operation is taken as an instruction to cut off the power supply. In such a case, processing of turning off the power is performed, thus cutting off power supply to the CPU 10 and the peripheral devices. In addition, if the user performs no operation for a predetermined time, the display terminal 1 is considered as not in use. In such a case, the processing to turn off the power will be performed, thus cutting off power supply to the CPU 10 and the peripheral devices.

On the display terminal 1 of the present embodiment, when the power is turned off, a message saying "POWER SUPPLY IS OFF" appears in the second display region 212 (see FIG. 8). Looking at the message, the user knows the power of the display terminal 1 is off when the user is going to use the display terminal 1. Therefore, the user recognizes that the display terminal 1 will not respond immediately after the user operates a key, but start-up operations are performed prior to the processing corresponding to any of the operation keys 14 operated by the user.

Figure 9:
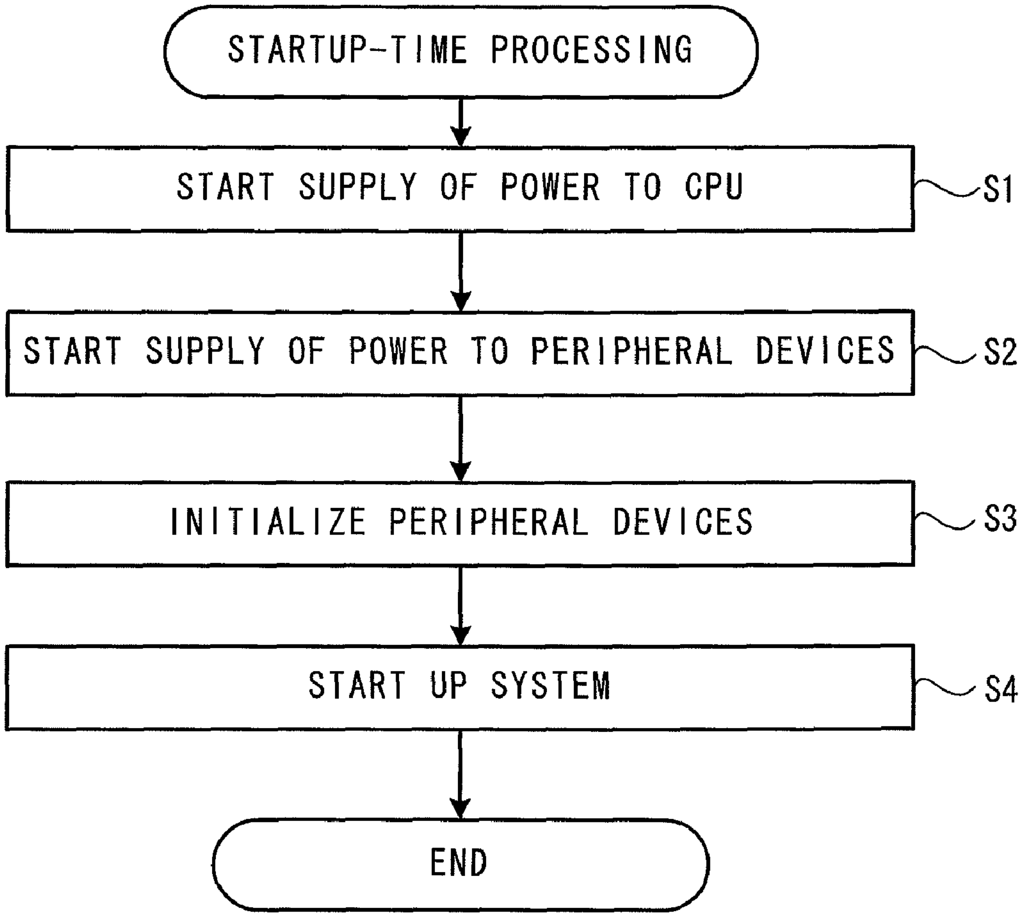
FIG. 9 is a flowchart of startup-time processing of a display terminal.

Next, operations of the display terminal 1 are described below with reference to flowcharts of FIGS. 9 and 10. Startup-time processing shown in FIG. 9 is initiated when the power of the display terminal 1 is turned on, that is, when supply of power begins. Specifically, the processing is initiated when the power supply button 15 or any of the operation keys 14 is pressed. Main processing shown in FIG. 10 will be performed by the CPU 10 executing the display terminal program stored in the ROM 16, when the system is started up by the startup-time processing.

As shown in FIG. 9, in the startup-time processing, power supply to the CPU 10 is started (S1), and subsequently, power supply to the peripheral devices is started (S2). Then, initializing process of the peripheral devices is performed (S3), so that the system starts up by the CPU 10 (S4). Upon start-up of the system, the display terminal program is executed to carry out the main processing.

Figure 10:
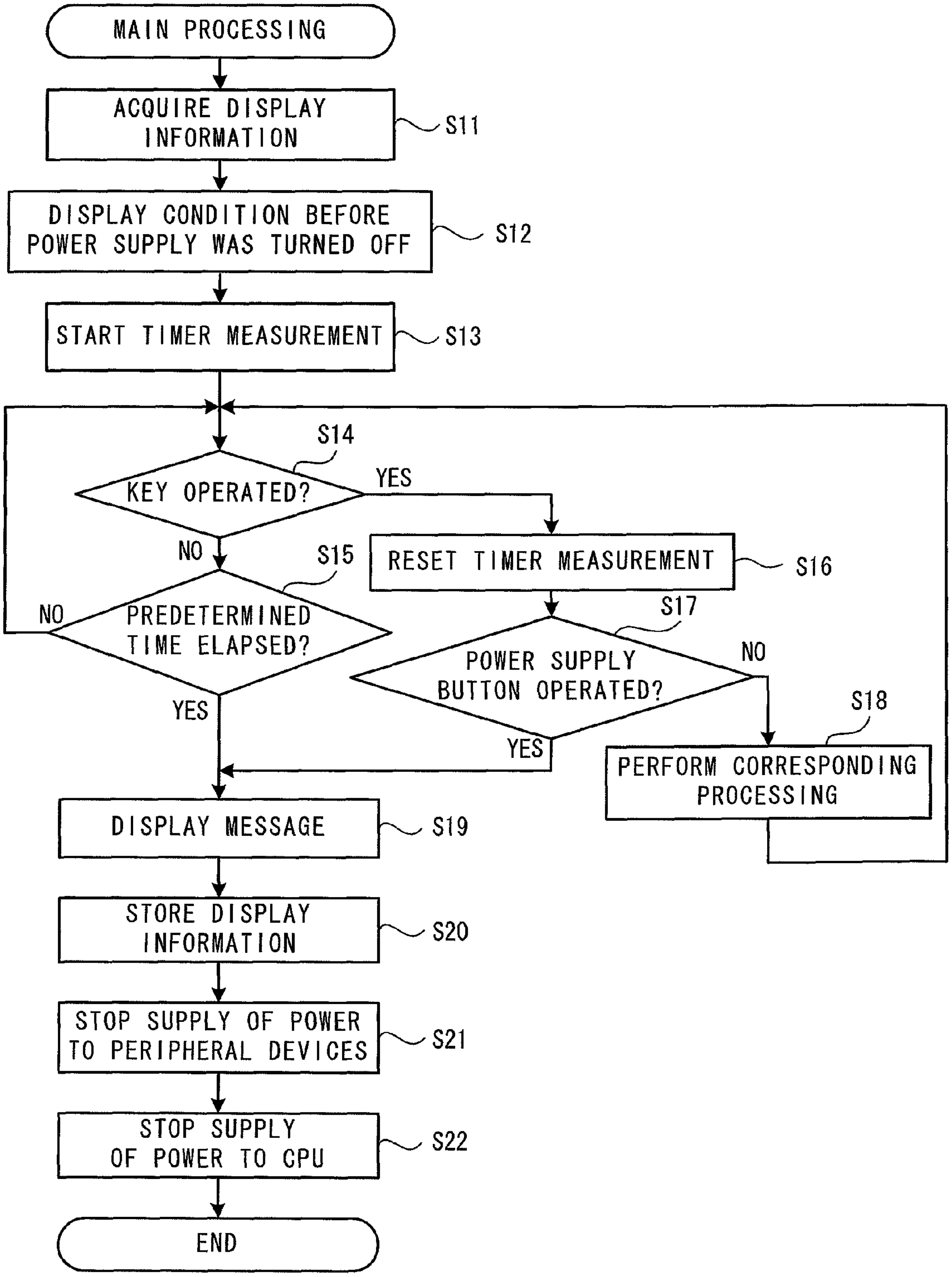
FIG. 10 is a flowchart of main processing of a display terminal.

As shown in FIG. 10, in the main processing, display information stored in the EEPROM 18 is acquired (SI 1). The display information refers to information that indicates the information which has been displayed on the electrophoretic display device 21 when power supply to the display terminal 1 has been cut off and which has been stored in a predetermined storage area in the EEPROM 18 (see step S20). The display information that has been stored at that time is acquired at step S11. Subsequently, based on the acquired display information, the auxiliary information corresponding to the content currently displayed in the first display region 211 is displayed in the second display region 212 (S12). The content currently displayed in the first display region 211 is a content that was displayed when power supply was cut off and that has been held even after the power supply was cut off. For example, if a content is displayed in the first display region 211, a saving location, a name of the content and the number of pages may be displayed in the second display region 212. Further, if a menu screen is displayed in the first display region 211, an illustration which indicates the remaining battery level may be displayed.

Subsequently, timer measurement is started (S13). Specifically, a timer storage area (not shown) arranged in the RAM 17 is initialized. One (1) is added to a value stored in the timer storage area by a time measurement program (not shown) each time a predetermined time period (for example, one second) has passed. Therefore, by referring to the value in the timer storage area, it is possible to acquire an elapsed time from the start of timer measurement. In the display terminal 1 of the present embodiment, if a predetermined time period has passed while no operation has been performed by the user, power supply to the display terminal 1 is cut off. Therefore, timer measurement is carried out in order to measure an elapsed time during which the user has performed no operation. A value that indicates a predetermined time period is stored in the ROM 16 or the EEPROM 18. The value may be set beforehand or may be set by the user with display terminal 1.

Subsequently, it is determined whether a key operation is performed. Specifically, it is determined whether any of the operation keys 14 or the power supply button 15 is operated (S14). If no key operation is performed (NO at S14), it is determined whether the predetermined time period has passed, referring to the timer storage area (S15). If the predetermined time period has not passed (NO at S15), the process returns to step S14, and determination on the key operation is made again. If any of the operation keys 14 or the power supply button 15 is pressed and if it is determined that key operation is performed (YES at S14), zero (0) is stored in the timer storage area, and timer measurement is reset (S16). If the operated key is the power supply button 15 (YES at S17), the process proceeds to step S19 to perform processing of turning off the power (S19 to S22). If the pressed key is not the power supply button 15 (NO at S17), other processing is performed, corresponding to the pressed key among the operation keys 14 (S18). For example, if the right key 143 is pressed (for turning over a page) when a content is being displayed, the content displayed in the first display region 211 are updated with the next page. Then, the process returns to step S14.

In such a manner, each time any of the operation keys 14 is operated (YES at S14), timer measurement is reset to start measuring a time over which the user has performed no operation (S16), and the processing that corresponds to the operated key of the operation keys 14 is performed (S18). If the value stored in the timer storage area becomes larger than the value indicating the predetermined time before any key is operated , that is, the predetermined time period has passed without any key operations (YES at S15), the process proceeds to step S 19 to perform the processing to turn off the power (S19 to S22).

In the processing to turn off the power, first, the message saying "POWER SUPPLY IS OFF" is displayed in the second display region 212 as the notification information to indicate that power supply to the display terminal 1 has been cut off (S19). Then, the display information about the information currently displayed in the first display region 211 is stored into the EEPROM 18 (S20). Based on the thus stored information, the content displayed on the electrophoretic display device 21 will be updated when the display terminal 1 is started up later. Subsequently, power supply to the peripheral devices is cut off (S21), and power supply to the CPU 10 is cut off (S22), thus, ending the main processing.

In such a manner, in the display terminal 1 of the present embodiment, the power supply may be cut off if the instruction for cutting off the power supply is made by pressing the power supply button 15, or if no key operation is performed for the predetermined time. In such a case, in the second display region 212 of the electrophoretic display device 12, the message saying "POWER SUPPLY IS OFF" appears, which is an example of the notification information indicating that power supply to the display terminal 1 has been cut off. Looking at the message when the user is going to use the display terminal 1, the user knows that power supply to the display terminal 1 has been cut off. Therefore, the user recognizes that the user needs to perform operations to turn on the power. In addition, the user recognizes that the display terminal 1 will not respond immediately even if he presses the power supply button 15 or any of the operation keys 14, because the display terminal 1 will be initialized first. Accordingly, the user may not be confused in operating the display terminal 1.

Further, only the content displayed in the second display region 212 of the display region 210 may be updated, while the content displayed in other display regions, for example, in the first display region 211, may remain unchanged. Therefore, even after power supply is cut off, the user can view information (for example, a content) displayed in the first display region 211. Further, because only the content displayed in the second display region 212 is updated, no extra power will be consumed, and a time to update the information can be reduced. Moreover, when power supply is restarted, the content displayed in the second display region 212 may be updated with information corresponding to a type of information that had been displayed before power supply was cut off. Accordingly, the notification information that indicates power supply has been cut off may not remain displayed after restart of the power supply. Further, because the information corresponding to the type of information that had been displayed before power supply was cut off may be displayed, the user uses the display terminal 1 in the same way as before the power supply was cut off.

The display terminal 1 of the present disclosure is not limited to the above-described embodiments, but of course may be changed variously without departing from the gist of the present disclosure. In an above-described embodiment, as the notification information to indicate that power supply to the display terminal 1 has been cut off, the message saying "POWER SUPPLY IS OFF" is displayed. Nevertheless, the notification information is not limited to the message, but only needs to indicate that power supply to the display terminal 1 has been cut off. Besides characters, the notification information may be, for example, an illustration, pictographic characters, a pattern, a frame enclosing the entire display region 120, or a frame enclosing specific characters or information. In an above-described embodiment, a content and auxiliary information of the content are stored in the memory card 23. Nevertheless, a hard disk drive may be installed in the display terminal 1 to store the content and the auxiliary information. Further, the content and the auxiliary information may be stored in the EEPROM 18 or in the RAM 16.

Further, in an above-described embodiment, the notification information is displayed in the second display region 212, which presents information to supplement the main information displayed in the first display region 211 or the notification information for the user. In other words, the notification information is displayed in a partial region of the display region 210. In an above-described embodiment, the second display region 212 is arranged at the bottom of the display region 210. The layout of the first display region 211 and the second display region 212 in the display region 210, however, is not limited to this layout. For example, the second display region may be arranged at the upper, right, or left end of the display region 210. In addition, the layout of the first display region and the second display region in the display region 210 may be changed in accordance with contents of the information displayed in the first display region. For example, if a content is displayed in the first display region, the second display region may be arranged at the bottom as shown in FIGS. 6 to 8. On the other hand, the second display region may be arranged at the right end on the menu screen.

Further, the partial region of the display region 210 in which the notification information is displayed is not limited to the second display region 212. The notification information may be displayed in the first display region 211. Further, the notification information may be displayed near an edge of the first display region 211, such as a top, bottom, left end, right end, upper left corner, upper right corner, lower left corner, or lower right corner. Further, the notification information may be displayed at a peripheral part of the display region 210. In such a case, a possibility that the notification information stands in the way of the information displayed in the first display region 211 may be reduced. On the other hand, the notification information may be displayed at the midsection of the display region 210 in order to make the notification information conspicuous.

Further, in an above-described embodiment, only the second display region 212 may be updated upon startup of the display terminal 1. In other words, only the pixels configuring the second display region 212 may be updated in display. Nevertheless, the region to be updated at step S12 upon startup may not be only the second display region 212. For example, the entirety of the display region 210 of the electrophoretic display device 21, that is, the first display region 211 and the second display region 212, may be updated.

Figure 11:
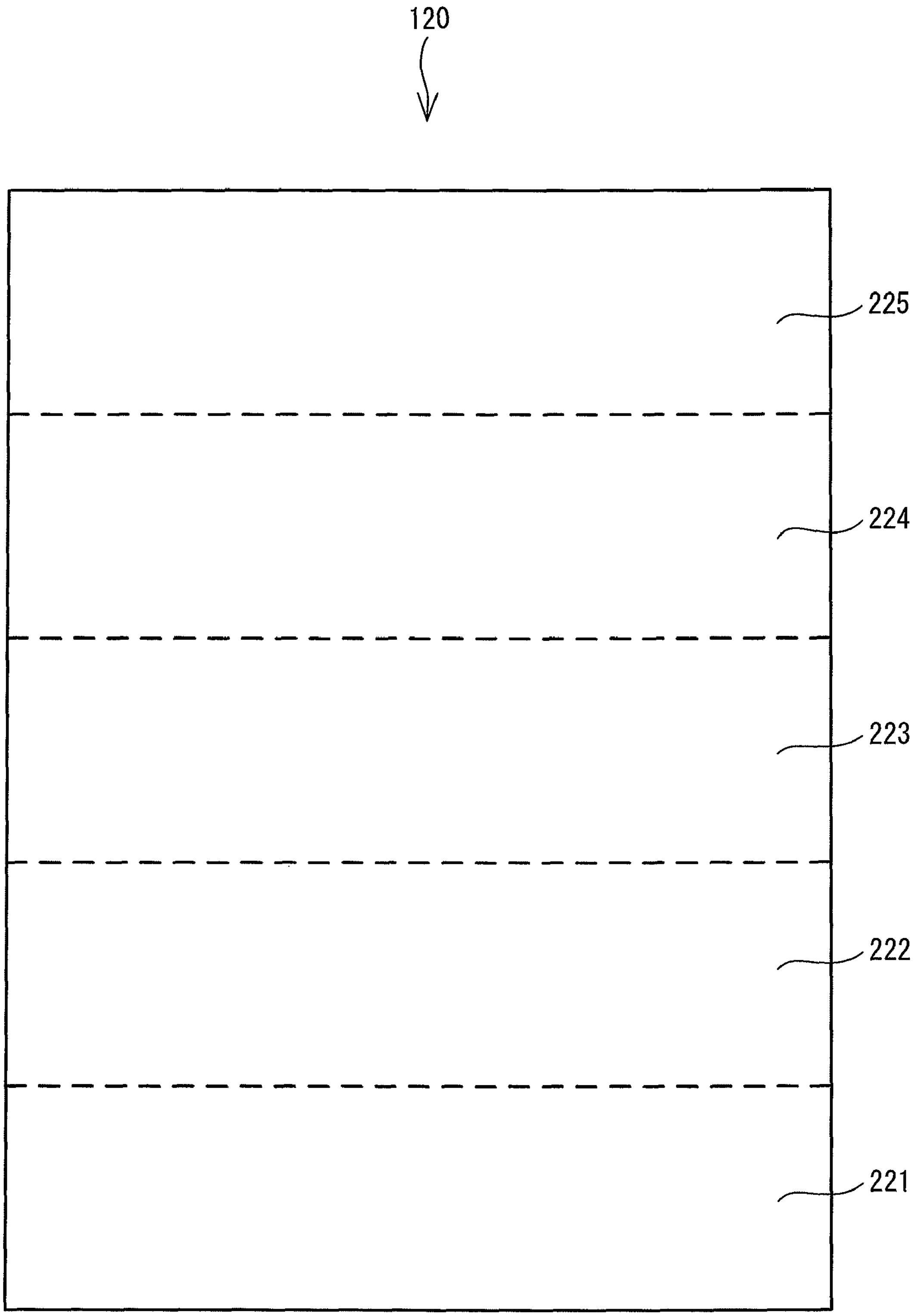
FIG. 11 is a schematic view illustrating a display region divided into five display management regions.

Further, in an above-described embodiment, the first display region 211 and the second display region 212 may be defined by dividing the display region 120 in terms of displayed contents. Nevertheless, the display region 120 may be divided into several regions for management of display updating. In such a case, only a region including the second display region 212 may be updated in display. For example, in an example shown in FIG. 11, the display region 120 is divided into five regions 221 to 225 for management of display updating. The five regions 221 to 225 are obtained by horizontally dividing the display region 120 and each region occupies 20% of the area of the display region 120. In this example, the second display region 212 (see FIGS. 6 to 8) may be included in the bottom region 221. Accordingly, at step S12, only the pixels configuring the region 221 may be updated. By thus updating only the region 221 or the second display region 212, the time required in update is reduced as compared to the case of updating the entire display region 120. Also, power required in update may decrease.

Further, in the case of updating only the second display region 212, updating the entire display region 120, or updating only the region 221 whose display update is managed, only those pixels whose display color is to be changed may be updated, instead of updating all the pixels of the region. In the example shown in FIG. 3, an uppercase alphabetic character "H" is displayed. In this case, when the display is updated to show an uppercase alphabetic character "E", the second and third pixels from the left in the top row and the second and third pixels in the bottom row are changed from white to black. Further, the second and fourth pixels in the rightmost column are changed from black to white. Therefore, only the six pixels of all the 20 pixels may be updated in display, thereby reducing the time and power required in update.

While the invention has been described in connection with various exemplary structures and illustrative embodiments it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A display terminal comprising:

a nonvolatile display device comprising a display region and configured to hold a display in the display region even when a supply of power from a power source is cut off, wherein the display region comprises a first display region configured to display main information and a second display region located in a region other than the first display region;

a storage device configured to store a content to be displayed on the display device;

a display control device configured to display, as the main information, the content stored in the storage device in the first display region and to display auxiliary information of the content in the second display region;

a determination device configured to determine whether to cut off the supply of power from the power source to the display terminal;

a power-off control device configured to update only the second display region to display notification information, while the content in the first display region remains unchanged, when the determination device has determined to cut off the supply of power from the power source to the display terminal, and subsequently to perform processing to cut off the supply of power from the power source to the display terminal, wherein the notification information indicates that the supply of power has been cut off; and a particular update device configured to update only the second display region to display information corresponding to a type of information displayed in the second display region before the notification information is displayed in the second display region by the power-off control device, while the content in the first display region remains unchanged, when the supply of power from the power source to the display terminal is started.

2. The display terminal according to claim 1, wherein the power-off control device is configured to cause the notification information to be displayed in a region arranged in one of upper, lower, right or left ends of the display region as the second display region.

3. The display terminal according to claim 1, wherein:

the display region comprises a plurality of unitary regions arranged in a lattice pattern; and the display terminal further comprises a further update device that is configured to update the display of only the unitary regions that change in a display condition from among the plurality of unitary regions, if the supply of power from the power source is started.

4. The display terminal according to claim 1, wherein:

the display region is divided into a plurality of regions for management of display updating; and the display terminal further comprises a further update device configured to update only the display of a region comprising the second display region from among the plurality of regions for management of display updating, when the supply of power from the power source is started.

5. A non-transitory, computer-readable medium having computer-readable instructions stored thereon for execution by a processor to perform a method for controlling a display terminal comprising a display device comprising a display region and configured to hold a display in the display region even when a supply of power from a power source is cut off, wherein the display region comprises a first display region configured to display main information and a second display region located in a region other than the first display region, the computer-readable instructions comprising instructions to execute the steps of:

displaying, as the main information, a content in the first display region and auxiliary information of the content in the second display region;

determining whether to cut off the supply of power from the power source to the display terminal;

updating only the second display region to display notification information, while the content in the first display region remains unchanged, when it has been determined to cut off the supply of power from the power source to the display terminal, wherein the notification information indicates that the supply of power has been cut off;

performing processing to cut off the supply of power from the power source to the display terminal; and updating only the second display region to display information corresponding to a type of information displayed in the second display region before the notification information was displayed in the second display region, while the content in the first display region remains unchanged, when the supply of power from the power source to the display terminal is started.

6. The non-transitory, computer-readable medium according to claim 5, wherein the step of updating the display in the second display region causes the notification information to be displayed in a region arranged in one of upper, lower, right or left ends of the display region as the second display region.

7. The non-transitory, computer-readable medium according to claim 5, wherein:

the display region comprises a plurality of unitary regions arranged in a lattice pattern; and the steps further comprise updating only the display of the unitary regions that change in display condition from among the plurality of unitary regions, if the supply of power from the power source to the display terminal is started.

8. The non-transitory, computer-readable medium according to claim 5, wherein:

the display region is divided into a plurality of regions for management of display updating; and the steps further comprise updating only the display of a region comprising the second display region from among the plurality of regions for management of display updating, when the supply of power from the power source to the display terminal is started.

* * * * *